Figure 1:
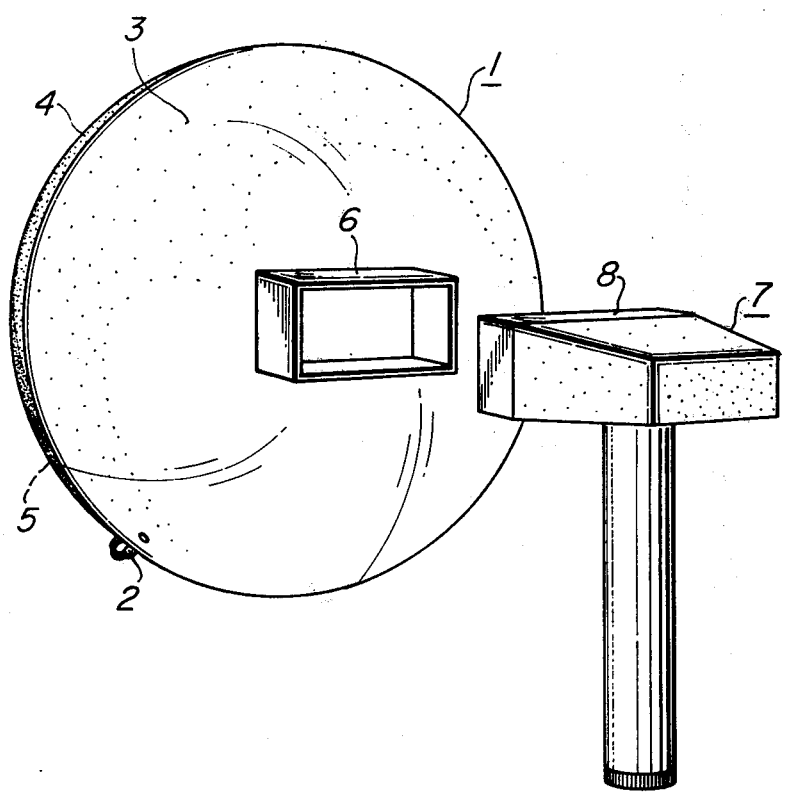

United States Patent [19]

Higuchi

[11] 4,075,472
[45] Feb. 21, 1978

[54] REFLECTOR FOR FLASH LIGHT APPARATUS
[75] Inventor: Masaru Higuchi, Toyonaka, Japan
[73] Assignee: West Electric Co., Ltd., Osaka, Japan
[21] Appl. No.: 665,073
[22] Filed: Mar. 8, 1976
[30] Foreign Application Priority Data
  Mar. 11, 1975  Japan .................................. 50-29864
[51] Int. Cl.² .............................................. F21V 7/02
[52] U.S. Cl. .................................... 362/255; 354/126;
   350/295; 362/16; 362/318; 362/320; 362/350;
   362/352
[58] Field of Search ............... 240/1.3, 103 R, 103 A,
   240/103 B; 354/126; 350/295

[56] References Cited
U.S. PATENT DOCUMENTS

| 2,078,707 | 4/1937  | Braunschweig | 240/10 C |
| 3,054,328 | 9/1962  | Rodgers      | 350/295  |
| 3,536,906 | 10/1970 | Bloom        | 240/10 C |
| 3,592,157 | 7/1971  | Schwartz     | 240/10 C |
| 3,836,761 | 9/1974  | Kleinman     | 240/10 C |
| 3,893,755 | 7/1975  | Cobarg       | 350/295  |

FOREIGN PATENT DOCUMENTS

| 1,309,907 | 10/1962 | France         | 350/295 |
| 987,195   | 3/1965  | United Kingdom | 350/295 |

Primary Examiner—L. T. Hix
Assistant Examiner—Alan Mathews
Attorney, Agent, or Firm—Stevens, Davis, Miller & Mosher

[57] ABSTRACT

A reflector apparatus for reflecting light produced by a flash light apparatus such as a flash bulb, an electronic flash apparatus or the like, comprises a sealable container capable of tightly containing a gas therein. The container is in the form of a substantially spherical configuration when inflated and is made of a soft and flexible material, a half portion of which is transparent while the other half portion reflects light. The light rays from the flash apparatus are transmitted through the transparent portion and are reflected by the reflecting portion toward an object to be illuminated.

5 Claims, 4 Drawing Figures

REFLECTOR FOR FLASH LIGHT APPARATUS

The present invention relates to a light reflecting apparatus for reflecting light produced by a flash light apparatus such as an incandescent lamp, a flash bulb, an electronic flash light device or the like to illuminate an object to be photographed with reflected light rays.

In the field of photography, it has hitherto been known to illuminate an object to be photographed with light produced by a flash light apparatus and reflected from the ceiling, walls or other environmental locations with a view toward improving the photographic conditions. This is sometimes referred to as bounce-flash type photography. It is further known to utilize an umbrella-like reflector incorporating a metallic frame, which is often referred to as an umbrella-bounce type reflector.

When the bounce-flash type reflection photography is used, the length of the optical path of the illuminating light extending from the flash light device to the object to be photographed through the ceiling, walls and other structures as well as the reflection factors of these reflecting structures can not be obtained, exactly. This makes it difficult to set the iris or diaphragm aperture at a suitable value, which in turn often disadvantageously results in an over-exposure or an insufficient exposure.

On the other hand, photography utilizing the umbrella-bounce type reflector can avoid the draw-back described above since the length of the light path extending from the flash apparatus to the object to be photographed through the reflecting umbrella as well as the reflection factor of the umbrella type reflector can be previously determined. However, the umbrella bounce type reflector is disadvantageous in that the volume thereof is very bulky and provides problems in portability even in the folded state because of the metallic frame work which increases the weight and size of the reflector. Besides, a reflector of this type requires a separate supporting structure since it can not be integrally mounted on the photographic camera itself. When photographing, it is therefore necessary to hold either the camera or the reflector in a hand and mount the other on a tripod, which requires simultaneously a relatively long synchronization control cable to assure snychronization between operation of the camera and ignition of the flash light apparatus. Furthermore, the umbrella type reflector is not only expensive because of costly material but also requires a great amount of time for assembly to the exploded position in which it is used.

Accordingly, an object of the present invention is to provide a novel reflector for a photographic flash light apparatus which does not suffer from the drawbacks of the conventional reflectors described above and which can be manufactured inexpensively in a light weight and a miniaturized size yet provide good portability and easy handling.

The above and other objects, novel features and advantages of the invention will become more apparent from the detailed description of embodiments of the invention taken in conjunction with the accompanying drawings.

Figure 2:
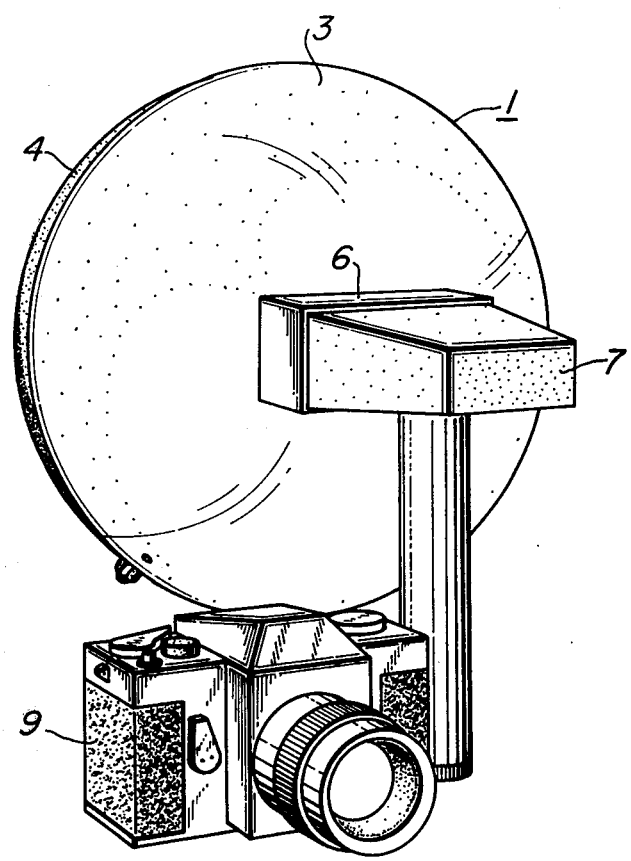
Figure 3:
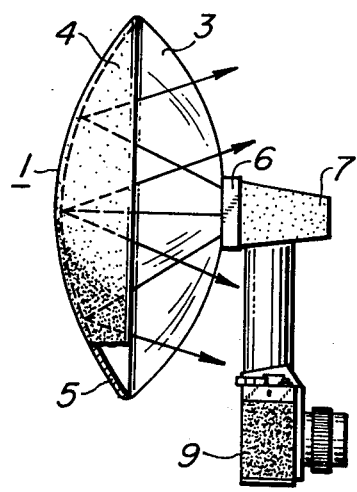
Figure 4:
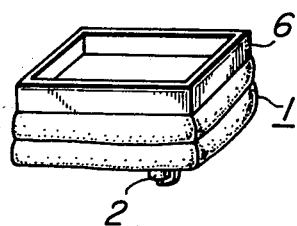

FIG. 1 is a pictorial view to illustrating schematically the general structure of a reflector apparatus according to an embodiment of the invention, FIG. 2 shows the same as used for photograph, FIG. 3 illustrates the reflection of light in the reflector of FIG. 2, and FIG. 4 shows the reflector apparatus according to the invention in a folded state.

Referring to FIG. 1 which shows schematically a reflector apparatus according to the invention, the apparatus designated generally by reference numeral 1 is made of a flexible or soft material such as vinyl chloride, nylon, high pressure polymerized polyethylene or the like. The reflector 1, which is fluid-tight, inflated into a spherical configuration by feeding thereto a gas such as air or helium. To this end, the reflector is provided with an opening 2 which is plugged by a suitable means. A front portion 3 of the reflector 1 is made transparent to transmit light therethrough, while a rear portion 4 of the reflector 1 is made of a flexible or soft material having a light reflecting property such as vinyl chloride, nylon or the like colored white. Alternatively, the rear semispherical portion may be coated with a light reflecting material 5 such as aluminum, silver or the like at the inner surface thereof.

The transparent front portion 3 of the reflector 1 is provided with a mounting frame 6 made of resin or metal and mounted on the exterior surface of the portion 3 at a middle location. This mounting frame 6 receives snuggly and removably a projecting portion 8 of an electronic flash apparatus 7 (hereinafter referred to as a strobo) in which projection a light emitting panel is mounted.

FIG. 2 shows the reflector apparatus according to the invention ready for use. As can be seen from this figure, the strobo 7 is mounted on a photographic camera 9 in such a position that the projecting portion 8 of the strobo 7 is oriented in the opposite direction to that of the lens system of the camera. The projecting portion 8 of the strobo 7 is snugly fitted in the mounting frame 6 of the reflector apparatus 1.

In this state, when the release button of the camera 9 is pushed to thereby ignite the strobo 7, the emitted light rays therefrom are reflected from the reflecting surface 5 to illuminate an object to be photographed with the reflected light.

In the above described example, it has been assumed that the reflector apparatus according to the invention is used in combination with the strobo during photography. However, it will be self-explanatory that the reflector apparatus according to the invention can be also used in combination with appropriately designed other flash apparatus such as an incandescent lamp, a flash bulb or the like.

As will be appreciated from the foregoing description, the light reflector apparatus for photographing according to the invention requires no supporting frame work, since the reflector is made of a flexible and soft material such as vinyl chloride, nylon or the like and can be self-supported by a sealingly confined gas such as air, helium or the like. Thus, the reflector apparatus according to the invention can be manufactured at low cost. Further, by virtue of its light weight and small size, the reflector according to the invention can be installed on the camera together with the strobo, thereby facilitating manipulation during photography without requiring additional supporting means. The reflector according to the invention has a most important application in combination with a strobe of a type lately developed and disclosed in Japan Utility Model Application No. 33293/73.

After use, the reflector apparatus can be folded in a very compact configuration as shown in FIG. 4. This feature combined with light weight provides enhanced portability of the reflector apparatus and provides high efficiency in practical use.

In FIG. 4, the reflector apparatus is shown folded around the mounting frame 6. However, it is equally possible to fold the reflector body in the frame 6.

In a modification of the invention, a handle or grip may be mounted on the exterior of the light reflecting portion 5, whereby the reflecting apparatus may be supported by the user separately from the camera. In still another modification, it is possible to make the size of the mounting frame 6 adjustable so that various sizes of strobos (flash apparatus) can be fitted in the frame. Further, by making the mounting frame 6 from a flexible and elastic material such as rubber, the frame 6 can be suited to different sizes of the strobos due to the elastic deformation of the material. Moreover, mounting of the strobo in the frame 6 may be effected with the aid of a suitable clamping means.

What is claimed is:

1. A reflector for a flash light apparatus, comprising:
    a sealable container made of a soft material selected from the group consisting of vinyl chloride, nylon and high pressure polymerized polyethylene and consisting of a light transmissive portion and a light reflecting portion, said container being inflatable into a sphere by confining a gas therein;
    gas inlet means attached to said container for introducing said gas into said container; and
    mounting means attached to the outside of the light transmissive portion of said container for mounting said flash light apparatus, light directed from said flash light apparatus being transmitted from the outside of said container through said light transmissive portion of said container and reflected by the light reflecting portion of said container back out through said light transmissive portion.

2. A reflector as set forth in claim 1 wherein said light reflecting portion comprises a light reflecting surface formed of a light reflecting material selected from the group consisting of aluminum and silver applied thereto.

3. A reflector as set forth in claim 1, wherein said light reflecting portion is made of said soft material colored so as to reflect light.

4. A reflector as set forth in claim 1, wherein said mounting means is adjustable.

5. A reflector as set forth in claim 1, wherein said mounting means is made of a elastically deformable material.

* * * * *